United States Patent [19]

Andrews

[11] 4,414,377
[45] Nov. 8, 1983

[54] EPOXIDE RESIN COMPOSITIONS CONTAINING ESTERS AS DILUENTS AND CURE ACCELERATORS

[75] Inventor: Christopher M. Andrews, Cambridge, England

[73] Assignee: Ciba-Geigy Corporation, Ardsley, N.Y.

[21] Appl. No.: 382,063

[22] Filed: May 26, 1982

[30] Foreign Application Priority Data

Jun. 3, 1981 [GB] United Kingdom ................. 8117065

[51] Int. Cl.³ .............................................. C08G 59/68
[52] U.S. Cl. ..................................... 528/88; 528/120; 528/121; 528/123; 528/370
[58] Field of Search ................. 528/88, 120, 121, 123, 528/370

[56] References Cited

U.S. PATENT DOCUMENTS

| | | | |
|---|---|---|---|
| 3,494,891 | 2/1970 | McWhorter et al. | 528/121 |
| 3,634,327 | 1/1972 | Hawkins | 260/47 EP |
| 3,714,120 | 1/1973 | Labana et al. | 528/88 |
| 3,853,812 | 12/1974 | Helm | 528/120 |
| 4,177,174 | 12/1979 | Hayashi et al. | 528/123 |

FOREIGN PATENT DOCUMENTS 921071 3/1963 United Kingdom .
1117109 6/1968 United Kingdom .

OTHER PUBLICATIONS

Derwent C.P.I. Abstract 52360x/28(=West German 2,459,752).

Derwent C.P.I. Abstract 06235c/04(=Japanese 79.155298).

Primary Examiner—Lucille M. Phynes
Attorney, Agent, or Firm—Luther A. R. Hall

[57] ABSTRACT

Curable compositions comprising an epoxide resin and an aliphatic amine curing agent are rendered less viscous, and their rate of cure is accelerated, by the addition of an ester of the formula

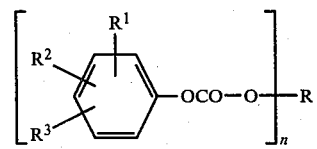

wherein
n represents an integer of from 1 to 6,
R represents the residue of a mono- or polyhydric alcohol or phenol after removal of n hydroxy groups, and
$R^1$, $R^2$, and $R^3$ may be the same or different and each represents a hydrogen or halogen atom or an alkyl group, or one or two of $R^1$, $R^2$, and $R^3$ may alternatively represent an acyloxy group.

Typical such esters of formula I include diphenyl carbonate, bis(phenoxycarbonyloxy) polybutadiene, and tris(phenoxycarbonyloxy) poly(oxypropylene). The compositions may be cured at room temperature and are particularly suitable for use as coatings and castings.

9 Claims, No Drawings

EPOXIDE RESIN COMPOSITIONS CONTAINING ESTERS AS DILUENTS AND CURE ACCELERATORS

BACKGROUND OF THE INVENTION

This invention relates to compositions for curing epoxide resins, to curable mixtures of these compositions and epoxide resins, and to cured products obtained by curing the aforesaid mixtures.

It is known that epoxide resins, i.e., substances containing on average more than one 1,2-epoxide group per molecule, may be cured by reaction with various classes of substances to form cross-linked, infusible, insoluble products having valuable technical properties. Typical curing agents include aliphatic, araliphatic, and heterocyclic-aliphatic amines, which are usually employed at room temperature.

For many applications, particularly as coatings and castings, it is required that the epoxide resins used have a low viscosity. This is usually achieved by the addition of diluents such as dibutyl phthalate and monoglycidyl ethers, e.g., iso-octyl glycidyl ether. Unfortunately, the addition of such diluents generally slows the rate of cure by the above-mentioned amines so that the mixtures take inconveniently long periods to gel. It has now been found that certain esters of phenols with carbonic acid may be mixed with epoxide resins both to lower the viscosity of the resins and also to accelerate the rate of cure with aliphatic amines at room temperature.

It has further been found that when such esters are used which have in the same molecule more than one carbonic acid ester group and also a long chain aliphatic group the resulting cured products have enhanced flexibility.

British patent specification No. 1,117,109 discloses that vic-alkylene carbonates may be incorporated into epoxide resin compositions where they act as solvents which lower the viscosity of the compositions and react with aliphatic amine curing agents to form carbamates. It is pointed out therein that there need be no weight loss during curing and no necessity for removal of volatile solvents. There is, however, no mention made that these alkylene carbonates have any accelerating action on the cure.

As is described in British patent specification No. 921,071, alkylene carbonates have been added to mixtures containing an epoxide resin, cellulose nitrate, and a curing agent for the epoxide resin in order to form subbing solutions. Such solutions are applied to hydrophobic, inert-surfaced film bases so that they will bond to a hydrophilic overcoating such as a non-curling layer or silver halide emulsion. The effect that addition of these alkylene carbonates has on viscosity and curing rate is not mentioned.

In West German patent application No. 2 459 752 there are described epoxide polyadducts prepared by heating an epoxide resin with cyanamide in the presence of a stabiliser which is a carboxylic acid or an alkyl or acyl ester of an organic or inorganic acid; diphenyl carbonate is among those esters which are preferred. As is generally known, cyanamide does not bring about the curing of epoxide resins at room temperature, heating to, e.g., 150° C. being required to achieve cure in a reasonably short time. The presence of the stabiliser increases the pot-life of the epoxide resin-cyanamide mixture; this addition therefore has the opposite effect to that of accelerating the rate of cure.

According to Japanese Kokai No. 79.155298, epoxy resins are heat-cured with aryl esters, especially polyaryl esters, which term is used to include aryl carbonates. The curing action may be catalysed by addition of 0.1 to 10% by weight of a tertiary amine such as pyridine, tributylamine, and N,N-dimethylaniline. As is also generally known, tertiary amines are not effective room temperature-curing agents for epoxide resins. The effect of the addition of these esters is to extend the pot life of the mixture and so improve workability. In a comparative example, a mixture of an epoxide resin, triacetyl phloroglucinol, and tributylamine remained unreacted after 4 days at 20° C. The effect sought is the opposite to that of accelerating the room temperature cure of epoxide resins.

The accelerating effect that has now been discovered could not be predicted by an examination of the above mentioned patents, since in none of them was such an effect suggested.

SUMMARY OF THE INVENTION

One aspect of this invention provides curable compositions comprising (a) an ester of the formula

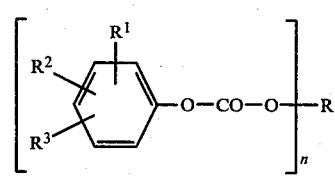

wherein n represents an integer of from 1 to 6,

R represents the residue of a mono- or polyhydric alcohol or a mono- or polyhydric phenol after removal of n hydroxy groups, $R^1$, $R^2$, and $R^3$ may be the same or different and each represents a hydrogen or halogen atom, especially a chlorine or bromine atom, or a straight chain or branched alkyl group having from 1 to 10 carbon atoms, or one or two of $R^1$, $R^2$, and $R^3$ may alternatively represent an acyloxy group having from 1 to 10 carbon atoms, (b) an aliphatic amine as hereinafter defined, and (c) an epoxide resin.

Such compositions may further contain (d) an aromatic amine as hereinafter defined.

By the term "aliphatic amine," as used in the present specification, is meant an amine having at least two hydrogen atoms directly attached to a nitrogen atom or nitrogen atoms, which nitrogen atom or atoms is or are in turn attached to an aliphatic (including cycloaliphatic) carbon atom or atoms. Preferably the aliphatic amine has at least three such hydrogen atoms.

By the term "aromatic amine," as used in the present specification, is meant an amine which is not an "aliphatic amine" as hereinbefore defined, and which has at least two hydrogen atoms directly attached to a nitrogen atom or nitrogen atoms, which nitrogen atom or atoms is or are attached directly to a carbon atom or carbon atoms that form part of an aromatic ring. Preferably the aromatic amine has three or more such hydrogen atoms.

A further aspect of this invention comprises a process for curing an epoxide resin which consists of forming a mixture of the epoxide resin, an ester of formula I, and a curing amount of an aliphatic amine as hereinbefore defined or a curing amount of such an amine together with an aromatic amine as hereinbefore defined and allowing the composition to cure.

DETAILED DISCLOSURE

Preferred esters of formula I are those wherein n represents 1 and R represents a phenyl, alkyl, phenoxyalkylene or phenoxycarbonyloxyalkylene group, wherein the alkyl and alkylene moieties each contain from 1 to 10 carbon atoms and may be straight chain or branched, the phenyl and phenoxy group or groups within the scope of R optionally being substituted by from 1 to 3 substituents selected from halogen atoms, especially chlorine or bromine atoms, and from straight chain or branched alkyl groups, each of from 1 to 3 carbon atoms, and those where n represents from 2 to 6, preferably from 2 to 4, and R represents an aliphatic hydrocarbon radical which may be saturated or unsaturated and which has a molecular weight within the range 28 to 5000, a group of formula

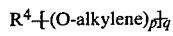

or a group of formula

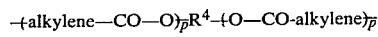

wherein
each "alkylene" group contains a chain of at least 2 and at most 6 carbon atoms between consecutive oxygen atoms,
$R^4$ represents an aliphatic hydrocarbon group of from 2 to 6 carbon atoms,
p is an integer such that the molecular weights of the groups of formulae II and III are within the range 200 to 5000, and
q is an integer of from 2 to 6.

Particularly preferred esters of formula I, used in accordance with the present invention, are those wherein n represents 1 and R represents a phenyl group, or a phenyl group substituted by two bromine atoms, those wherein n represents 2 and R represents neopentylene, a polyoxypropylene residue, especially one of molecular weight about 1500, or a polybutadiene residue, especially one of molecular weight about 3000, and those wherein n represents 3 and R represents glyceryl or a polyoxypropylene triol residue (i.e., the residue of a trihydric alcohol which is an adduct of an aliphatic triol, such as glycerol, with propylene oxide), especially one of molecular weight about 300, and particularly such compounds wherein $R^1$, $R^2$, and $R^3$ represent hydrogen atoms, chlorine atoms, bromine atoms or alkyl groups of 1 to 9 carbon atoms.

Specific examples of such esters of formula I are bis(2,4-dibromophenyl) carbonate, tert.butyl phenyl carbonate, 2-ethylhexyl p-nonylphenylcarbonate, bis(p-nonylphenyl) carbonate, mixed bis(isopropylphenyl) carbonates wherein each phenyl ring is substituted by one to three isopropyl groups, diphenyl carbonate, bis(phenoxycarbonyloxy) polybutadiene, bis(phenoxycarbonyloxy) poly(oxypropylene), bis(phenoxycarbonyloxy) poly(oxytetramethylene), and tris(phenoxycarbonyloxy) poly(oxypropylene).

Epoxide resins which may be employed in these compositions are preferably those containing groups of formula

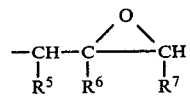

directly attached to atoms of oxygen, nitrogen, or sulphur, where either $R^5$ and $R^7$ each represent a hydrogen atom, in which case $R^6$ denotes a hydrogen atom or a methyl group, or $R^5$ and $R^7$ together represent —CH$_2$CH$_2$—, in which case $R^6$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n- butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula IV where $R^5$ and $R^7$ conjointly denote a —$CH_2CH_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid or p-hydroxybenzoic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

If desired, a mixture of epoxide resins may be used.

Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of more than 0.5 equivalent per kilogram.

As examples of curing agents (b) may be mentioned those conventionally employed for curing epoxide resins, e.g., n-butylamine, N,N-dimethylpropane-1,3-diamine, and more preferably amines containing three or more amino hydrogen atoms, such as diethylenetriamine, triethylenetetramine and their 1,2-propylene analogues, hexamethylenediamine and its 2,2,4-trimethyl and 2,4,4-trimethyl analogues, 4,9-dioxadodecane-1,12-diamine, m-xylylenediamine, 3-aminomethyl-3,5,5-trimethylcyclohexylamine (otherwise known as isophoronediamine), bis(4-amino-3-methylcyclohexyl)methane, 2,2-bis(4-aminocyclohexyl)propane, and N-(2-aminoethyl)piperazine. There may likewise be employed, on the same basis, aminoamides made from such a polyamine and a dicarboxylic acid or an amide-forming derivative thereof, or cyanoethylated amines made by the addition of acrylonitrile to such a polyamine. There may also be used, but they are less preferred, adducts of aliphatic polyamines with a stoichiometric deficit of a mono-1,2-epoxide such as ethylene oxide or propylene oxide; the adduct must still, of course, contain two or more amino hydrogen atoms.

Examples of the optional aromatic curing agent (d) include aniline, o-, m-, and p-phenylenediamine, bis(4-aminophenyl)methane, aniline-formaldehyde resins, bis(4-aminophenyl) ether, bis(4-aminophenyl) ketone, bis(4-aminophenyl) sulphide, bis(3-aminophenyl) sulphone, and bis(4-aminophenyl) sulphone.

The molar ratio of the aliphatic curing agent (b) to the optional aromatic curing agent (d) may vary between wide limits, but generally if (d) is included the ratio is within the range (b):(d) of 1:0.25 to 4.

An effective, i.e., a curing, amount of the amine is employed. The proportion will depend on the chemical nature of the amine (b), and (d) if present, and the properties sought of the curable composition and its cured product; the optimum proportion can readily be determined by methods familiar to those skilled in the art. It is believed, although the utility of this invention does not depend on the truth of this belief, that the ester of formula I reacts with the amine curing agent to form a phenol and an amide, and it is the liberated phenol that accelerates the cure of the epoxide resin. For this reason an additional quantity of amine is usually employed in excess of that required to react with the epoxide groups, to allow for that which is consumed in liberating the phenol. By way of illustration, there will normally be used a total of 0.75 to 4.0, and preferably from 1.0 to 2.0, amino-hydrogen equivalents of the amine (b), and (d) if present, per 1,2-epoxide equivalent of the epoxide resin.

The amount of the ester of formula I may vary according to the accelerating effect sought and also according to the desired viscosity, but usually from 2 to 50 parts by weight are employed per 100 parts by weight of the epoxide resin.

The ester of formula I is usually incorporated into the epoxide resin, and then the amine (b), and the amine (d) if used, is added, but it may also be incorporated with the amine (b), and the amine (d) if used, then the epoxide resin is added, or all three (or four) components may be mixed simultaneously.

Curing may be carried out at elevated temperatures, 30° to 100° C., for example, but is usually effected at room temperature, 15° to 25° C.

The new compositions may further contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specific surface area, powdered poly(vinyl chloride), and powdered polyolefin hydrocarbons such as polyethylene and polypropylene.

The curable compositions of this invention may be used as laminating resins, paints and lacquers, impregnating and casting resins, potting and insulating compounds for the electrical industry, and adhesives, and also in the manufacture of such products.

They may be supplied as a two-part pack, one part containing the epoxide resin and the ester of formula I and the other the amine curing agent (b), with (d) if used.

The following Examples illustrate the invention; all parts and percentages are by weight. The accelerating effect is shown, as is conventional in this art, by the reduction in the time taken for the composition to gel, prior to curing: gelation times were determined by means of a "Techne" gelation timer, supplied by Techne (Cambridge) Limited, Duxford, Cambridge, England. Viscosity was measured with a Brookfield viscometer, using spindle No. 3 at 6 r.p.m.

"Epoxide resin I" denotes a polyglycidyl ether of 2,2-bis(4-hydroxyphenyl)propane having a 1,2-epoxide content of 5.16 equivalents per kilogram "Epoxide resin II" denotes the N,N,N',N'-tetraglycidyl derivative of 4,4'-diaminodiphenylmethane, having a 1,2-epoxide content of 8.0 equivalents per kilogram.

"Epoxide resin III" denotes N,N'-diglycidyl-5,5-dimethylhydantoin

"Epoxide resin IV" denotes diglycidyl hexahydrophthalate having a 1,2-epoxide content of 6.5 equivalents per kilogram "Amine I" denotes a commercially-available mixture, in approximately equimolar proportions, of 2,2,4-trimethylhexamethylenediamine and 2,4,4-trimethylhexamethylenediamine "Amine II" denotes triethylenetetramine "Amine III" denotes N-(2-aminoethyl)piperazine "Amine IV" denotes isophoronediamine "Amine V" denotes N,N-dimethylpropane-1,3-diamine "Amine VI" denotes m-xylylenediamine "Amine VII" denotes bis(4-aminophenyl)methane "Amine VIII" denotes a polyaminoamide made from dimerised linoleic acid and triethylenetetramine. It was obtained under the designation "Versamid 140" from Cray Valley Products Ltd., Orpington, Kent, England. ("Versamid" is a registered Trade Mark.)

"Amine IX" denotes cyclohexylamine.

EXAMPLE 1

Epoxide resin I (50 parts), and an ester (5 parts) as specified in the Table following, were mixed at room temperature and the viscosity was measured at 23° C. Amine I (13 parts) was then added and the gelation time at 20° C. was measured. The results are given in Table I.

TABLE I

| Ester | Viscosity (Pa s) | Gelation time (minutes) |
|---|---|---|
| None (Control) | 17.8 | 65 |
| Diphenyl carbonate | 7.6 | 10 |
| Ethylene glycol bis(phenyl carbonate) | 9.8 | 14 |
| Bis(2,4-dibromophenyl) carbonate | 13.6 | 11 |
| tert.Butyl phenyl carbonate | 17.1 | 43 |
| 2-Ethylhexyl p-nonylphenyl carbonate | 8.1 | 30 |
| Bis(p-nonylphenyl) carbonate | 15.0 | 30 |
| Isopropylated diphenyl carbonate* | 10.0 | 12.5 |
| m-Cresyl phenyl carbonate | 10.0 | 12 |
| Neopentyl glycol bis(phenyl carbonate) | 7.7 | 14 |
| Ethyl phenyl carbonate | 4.0 | 12 |

*this material is a carbonate derived from a mixture having the approximate composition 40% o-isopropylphenol, 30% phenol, and 10% p-isopropylphenol, the remainder being mostly 2,6-di-isopropylphenol, 2,4-di-isopropylphenol, and 2,4,6-tri-isopropylphenol.

For purposes of comparison, an experiment was carried out using diluents other than the esters of formula I. These diluents (5 parts) were mixed with Epoxide resin I (50 parts) and then Amine I, in the stated quantity, was added. The results are shown in Table II.

TABLE II

| Diluent | Amine I (Parts) | Viscosity (Pa s) | Gelation time (minutes) |
|---|---|---|---|
| Dibutyl phthalate | 10.5 | 5.0 | 105 |
| Dibenzyl carbonate | 13.0 | 4.8 | 168 |
| Cresyl glycidyl ether | 11.5 | 5.1 | 76 |
| Iso-octyl glycidyl ether | 11.5 | 2.8 | 93 |

These results show that the addition of these materials which included both "active" and inert diluents, slowed the rate of cure of the resin to an appreciable degree.

EXAMPLE 2

Epoxide resin I (50 parts) and diphenyl carbonate (5 parts) were mixed and combined with an amine curing agent of the type and quantity specified in Table III. The gelation times at 20° C. were then measured, the results being given in Table III.

TABLE III

| Curing Agent | | Gelation time (mins.) with | |
|---|---|---|---|
| Type | Quantity (parts) | No accelerator (control) | Diphenyl carbonate |
| Amine II | 6 | 36 | — |
| Amine II | 7 | — | 4 |
| Amine III | 10.5 | 17 | — |
| Amine III | 3 | — | 4 |
| Amine IV | 11.5 | 108 | — |
| Amine IV | 15 | — | 15 |
| Amine V | 5 | 87 | 12 |
| Amine VI | 9 | 64 | — |
| Amine VI | 11 | — | 9 |
| Amine VII + Amine I | 12 +2.6 | 404 | — |
| Amine VII + Amine I | 16 +3.7 | — | 214 |
| Amine VIII | 25 | 198 | 43 |

For purposes of comparison, this experiment was repeated but using as curing agent 5 parts of a solely tertiary amine which is also a phenol, tris(dimethylaminomethyl)phenol, i.e., a composition not falling within the scope of the present invention. Without addition of an accelerator of this invention, a composition containing this amine gelled after 63 minutes. When 5 parts of diphenyl carbonate was included, the composition gelled after 70 minutes. The addition of the ester therefore caused retardation of cure by this particular tertiary amine.

EXAMPLE 3

Example 1 was repeated, using 50 parts of Epoxide resin II in place of Epoxide resin I. The amount of Amine I and of Amine IX, and the results obtained, are shown in Table IV.

TABLE IV

| Ester | Amine I (parts) | Amine IX (parts) | Gelation time (minutes) |
|---|---|---|---|
| None (control) | 16 | — | 189 |
| Diphenyl carbonate | 18.5* | — | 17 |
| None (control) | — | 21.5 | 2343 |
| Diphenyl carbonate | — | 24* | 900 |

*The amount of amine used when diphenyl carbonate is present is greater than that when diphenyl carbonate is absent in order to allow for that consumed in liberating the phenol.

It may therefore be seen that the cure of Epoxide resin II with the two amines was considerably accelerated by means of the ester of formula I.

EXAMPLE 4

Example 1 was repeated, using 50 parts of Epoxide resin I, 18 parts of Amine I, and 10 parts of diphenyl carbonate. The mixture of the resin and ester had a viscosity at 23° C. of 5.95 Pa s and the mixture of all three components gelled after 5 minutes at 20° C.

EXAMPLE 5

Epoxide resin I (50 parts) was mixed at room temperature with bis(phenoxycarbonyloxy) poly(oxypropylene) (5 parts; molecular weight approximately 1750). The viscosity of this mixture, measured at 23° C., was 13.6 Pa s. Amine I (11 parts) was then added and the gelation time at 20° C. found to be 66 minutes.

It is known that when a long-chain molecule is built into a cured resin, the final properties, especially toughness, are enhanced but the time necessary for complete cure is increased. For purposes of comparison, this experiment was repeated, but replacing the bis(phenoxycarbonyloxy) poly(oxypropylene) with an equal weight of bis(glycidyloxy) poly(oxypropylene) having a molecular weight of approximately 1600, i.e., the diglycidyl ether of the polymeric diol rather than its bis(phenyl carbonate). In this way the same long chain could be built into the cured molecule. The viscosity of this mixture of resins, measured at 23° C., was 8.8 Pa s and the gelation time at 20° C. was 90 minutes.

Comparing these results, and also those described in Example 1 for the unmodified mixture of Epoxide resin I and Amine I, it may be seen that the addition of the long chain polyol bis carbonate lowered the viscosity without affecting the gel time to any appreciable extent. When this long chain was incorporated by conventional means, being added as the diglycidyl ether, the viscosity was again lowered but the gel time was much longer.

EXAMPLE 6

Epoxide resin III (50 parts) was mixed with 15.5 parts of Amine I at room temperature; the gelation time was 45 minutes. In another experiment Epoxide resin III (50 parts) was mixed with diphenyl carbonate (5 parts), the mixture was stirred at 60° C. until homogeneous and then cooled to room temperature. Amine I (19 parts, the larger amount being taken to allow for that consumed in liberating phenol) was then added; the gelation time was 7½ minutes.

EXAMPLE 7

Epoxide resin IV (50 parts) was mixed with 12.5 parts of Amine I at room temperature; the gelation time was 115 minutes. The second part of Example 6 was repeated, with 50 parts of Epoxide resin IV, 16 parts of Amine I, and 5 parts of diphenyl carbonate: the gelation time was 10 minutes.

What is claimed is:
1. A curable composition comprising
  (a) an ester of the formula

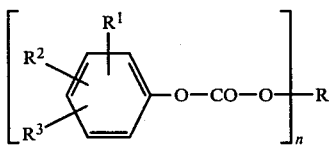

where
  n represents an integer of from 1 to 6,
  R represents the residue, after removal of n hydroxy groups, of an alcohol or a phenol,
  $R^1$, $R^2$, and $R^3$ may be the same or different and each represents a hydrogen atom, a halogen atom, or a straight chain or branched alkyl group having from 1 to 10 carbon atoms, with the proviso that one or two of $R^1$, $R^2$, and $R^3$ may alternatively represent an acyloxy group having from 1 to 10 carbon atoms,
  (b) an amine having at least two hydrogen atoms directly attached to a nitrogen atom or to nitrogen atoms, which nitrogen atom or atoms is or are in turn directly attached to an aliphatic or cycloaliphatic carbon atom or atoms, and
  (c) an epoxide resin.

2. A composition according to claim 1 which further contains
  (d) an aromatic amine, other than an amine (b), which has at least two hydrogen atoms directly attached to a nitrogen atom or nitrogen atoms, which nitrogen atom or atoms is or are attached directly to a carbon atom or carbon atoms that forms or form part of an aromatic ring.

3. A composition according to claim 1 in which n represents 1 and R represents either
  (i) a phenyl, alkyl, phenoxyalkylene, or phenoxycarbonyloxyalkylene group, wherein the said alkyl and alkylene moieties each contain from 1 to 10 carbon atoms and are straight chain or branched, or
  (ii) a phenyl, phenoxyalkylene group, or a phenoxycarbonyloxyalkylene group substituted by from 1 to 3 substituents selected from halogen atoms and from straight chain or branched alkyl groups, each of from 1 to 3 carbon atoms, wherein the said alkylene moieties each contain from 1 to 10 carbon atoms and are straight chain or branched.

4. A composition according to claim 1 in which n represents from 2 to 6 and R represents
  (iii) a saturated or unsaturated aliphatic hydrocarbon radical which has a molecular weight within the range 28 to 5000 or
  (iv) a group of formula

     II or
  (v) a group of formula

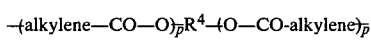     III where
  each "alkylene" group contains a chain of at least 2 and at most 6 carbon atoms between consecutive oxygen atoms,
  $R^4$ represents an aliphatic hydrocarbon group from 2 to 6 carbon atoms,
  p is an integer such that the molecular weight of the groups of formula II and III are within the range 200 to 5000, and
  q is an integer of from 2 to 6.

5. A composition according to claim 1 in which n either represents 2 in which case R represents neopentylene, a polyoxypropylene residue, or a polybutadiene residue, or n represents 3 in which case R represents a glyceryl or polyoxypropylene triol residue.

6. A composition according to claim 1 in which the ester of formula I is bis(2,4-dibromophenyl) carbonate, tert.butyl phenyl carbonate, 2-ethylhexyl p-nonylphenyl carbonate, bis(nonylphenyl) carbonate, mixed bis(isopropylphenyl) carbonates wherein each phenyl ring is substituted by one to three isopropyl groups, diphenyl carbonate, bis(phenoxycarbonyloxy) polybutadiene, bis(phenoxycarbonyloxy) poly(oxypropylene) bis(phenoxycarbonyloxy) poly(oxytetramethylene), or tris(phenoxycarbonyloxy) poly(oxypropylene).

7. A composition according to claim 1 which contains a total of 0.75 to 4 amino-hydrogen equivalents of the amine (b), and the aromatic amine (d) if present, per 1,2-epoxide equivalent of the epoxide resin.

8. A composition according to claim 1 which contains from 2 to 50 parts by weight of the ester of formula I per 100 parts by weight of the epoxide resin.

9. A process for curing an epoxide resin which consists of forming a composition according to claim 1 and allowing the composition to cure.

* * * * *